US009226251B2

United States Patent
Zhou et al.

(10) Patent No.: US 9,226,251 B2
(45) Date of Patent: Dec. 29, 2015

(54) SYSTEMS AND METHODS FOR OPTIMIZATION OF SYNCHRONIZATION MESSAGE TRANSMISSION INTERVALS IN A PEER-TO-PEER NETWORK

(71) Applicant: QUALCOMM Incorporated, San Diego, CA (US)

(72) Inventors: Yan Zhou, San Diego, CA (US); Santosh Paul Abraham, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 13/789,425

(22) Filed: Mar. 7, 2013

(65) Prior Publication Data
US 2014/0153560 A1 Jun. 5, 2014

Related U.S. Application Data

(60) Provisional application No. 61/735,789, filed on Dec. 11, 2012.

(51) Int. Cl.
*H04W 56/00* (2009.01)
*H04J 3/06* (2006.01)
*H04W 84/18* (2009.01)

(52) U.S. Cl.
CPC ........... *H04W 56/001* (2013.01); *H04J 3/0638* (2013.01); *H04W 56/002* (2013.01); *H04W 56/0015* (2013.01); *H04W 84/18* (2013.01)

(58) Field of Classification Search
CPC .............. H04J 3/0635–3/0697; H04W 56/002; H04W 56/0015; H04W 52/001; H04W 52/0015; H04W 52/002; H04W 56/001; H04W 56/00; Y02B 60/40–60/50
USPC .......................................................... 370/350
See application file for complete search history.

(56) References Cited

U.S. PATENT DOCUMENTS

| 6,310,886 B1 * | 10/2001 | Barton .................... H04L 12/66 370/443 |
| 7,072,432 B2 | 7/2006 | Belcea |
| 7,623,552 B2 | 11/2009 | Jordon et al. |

(Continued)

OTHER PUBLICATIONS

Sommer, P. & Wattenhofer, R. (Apr. 2009). Gradient clock synchronization in wireless sensor networks. Proceedings from IPSN 2009: International Conference on Information Processing in Sensor Networks. See highlighted sections on pp. 37, 38 & 40-42.
Ganeriwal S., et al., "Estimating Clock Uncertainty for Efficient Duty-Cycling in Sensor Networks", IEEE/ACM Transactions on Networking, IEEE/ACM, New York, NY, US, vol. 17, No. 3, Jun. 1, 2009, pp. 843-856, XP011248103, ISSN: 1063-6692 p. 8-p. 9.

(Continued)

*Primary Examiner* — Mark Rinehart
*Assistant Examiner* — Kenneth P Hunt
(74) *Attorney, Agent, or Firm* — Steven R. Thiel

(57) ABSTRACT

Methods, devices, and computer program products for optimization of synchronization message transmission intervals in a peer-to-peer network are described herein. In one aspect, a method for determining an optimized timing for synchronization messages is provided. The method includes receiving clock drift information from other devices on the peer-to-peer wireless communication network. This clock drift information may be used to determine the frequency with which new synchronization messages must be sent in order to keep synchronization error under a certain requirement at other devices, while minimizing the network traffic due to the transmissions of synchronization messages.

31 Claims, 6 Drawing Sheets

(56) References Cited

U.S. PATENT DOCUMENTS

| 7,957,343 | B2 | 6/2011 | Tsai et al. | |
|---|---|---|---|---|
| 2002/0072381 | A1* | 6/2002 | Becker | H04B 7/2687 455/502 |
| 2002/0193945 | A1* | 12/2002 | Tan | H04W 56/001 701/469 |
| 2005/0197680 | A1* | 9/2005 | DelMain | A61B 5/07 607/60 |
| 2006/0030362 | A1* | 2/2006 | Fukuda | H04W 48/12 455/561 |
| 2006/0133408 | A1* | 6/2006 | Nogueira-Nine | H04W 52/0219 370/447 |
| 2008/0212690 | A1* | 9/2008 | Loukas | H04N 21/23406 375/240.28 |
| 2008/0240163 | A1* | 10/2008 | Ibrahim | H04J 3/0664 370/503 |
| 2010/0002679 | A1* | 1/2010 | Zhang | H04W 56/0035 370/350 |
| 2010/0235486 | A1* | 9/2010 | White | H04L 43/0858 709/223 |
| 2011/0128869 | A1* | 6/2011 | Coleri Ergen | H04W 56/002 370/252 |
| 2011/0164710 | A1* | 7/2011 | Nowshadi | H04L 7/02 375/354 |
| 2011/0268097 | A1* | 11/2011 | Agrawala | G01S 5/021 370/338 |
| 2013/0010781 | A1 | 1/2013 | Gresset et al. | |

OTHER PUBLICATIONS

Ghanadan R., et al., "A Novel Distributed Medium Access Control and Synchronization for Ad-Hoc Sensor Networks", Telecommunications, 2009, AICT '09, Fifth Advanced International Conference on, IEEE, Piscataway, NJ, USA, May 24, 2009, pp. 453-458, XP031473478, ISBN: 978-1-4244-3840-2 abstract.

International Search Report and Written Opinion—PCT/US2013/070823—ISA/EPO—Feb. 25, 2014.

Sheu J.P., et al., "A clock synchronization algorithm for multi-hop wireless ad hoc networks", Distributed Computing Systems, 2004, Proceedings, 24th International Conference on Hachioji, Tokyo, Japan Mar. 24-26, 2004, Piscataway, NJ, USA,IEEE, Mar. 24, 2004, pp. 574-581, XP010693794, DOI: 10.1109/ICDCS.2004.1281624 ISBN: 978-0-7695-2086-5 abstract.

Xiao H., et al., "A Multi-hop Low Cost Time Synchronization Algorithm for Wireless Sensor Network in Bridge Health Diagnosis System", Embedded and Real-Time Computing Systems and Applications (RTCSA), 2012 IEEE 18th International Conference on, IEEE, Aug. 19, 2012, pp. 392-395, XP032236871, DOI: 10.1109/RTCSA.2012.65 ISBN: 978-1-4673-3017-6 abstract.

Zhong Z., et al., "On-demand time synchronization with predictable accuracy", INFOCOM, 2011 Proceedings IEEE, IEEE, Apr. 10, 2011, pp. 2480-2488, PX 031953459, DOI: 10.1109/INFCOM.2011.5935071 ISBN: 978-1-4244-9919-9 paragraph [III.A]-paragraph [III.E].

* cited by examiner

SYSTEMS AND METHODS FOR OPTIMIZATION OF SYNCHRONIZATION MESSAGE TRANSMISSION INTERVALS IN A PEER-TO-PEER NETWORK

CLAIM OF PRIORITY UNDER 35 U.S.C. §119

The present Application for Patent claims priority to Provisional Application No. 61/732,032 entitled "SYSTEMS AND METHODS FOR OPTIMIZATION OF SYNCHRONIZATION MESSAGE TRANSMISSION INTERVALS IN A PEER-TO-PEER NETWORK" filed Nov. 30, 2012, and assigned to the assignee hereof and hereby expressly incorporated by reference herein. The present Application for Patent further claims priority to Provisional Application No. 61/735,789 entitled "SYSTEMS AND METHODS FOR OPTIMIZATION OF SYNCHRONIZATION MESSAGE TRANSMISSION INTERVALS IN A PEER-TO-PEER NETWORK" filed Dec. 11, 2012, and assigned to the assignee hereof and hereby expressly incorporated by reference herein.

BACKGROUND

1. Field

The present application relates generally to wireless communications, and more specifically to systems, methods, and devices for optimization of synchronization message transmission intervals in a in a peer-to-peer wireless network.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. To carry out various communications, the devices may need to coordinate according to a protocol. As such, devices may exchange information to coordinate their activities Improved systems, methods, and devices for coordinating transmitting and sending communications within a wireless network are desired.

FIG. 1a illustrates an example of a prior art wireless communication system 100. The wireless communication system 100 may operate pursuant to a wireless standard, such as an 802.11 standard. The wireless communication system 100 may include an AP 104, which communicates with STAs. In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c although this communication link is not illustrated in FIG. 1a.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link may be established between STAs. Some possible communication links between STAs are illustrated in FIG. 1a. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs associated with the AP 104 and that use the AP 104 for communication may be referred to as a basic service set (BSS).

It should be noted that the wireless communication system 100 may not have a central AP 104, but rather may function as a peer-to-peer network between the STAs. Accordingly, the functions of the AP 104 described herein may alternatively be performed by one or more of the STAs.

FIG. 1b illustrates an example of a prior art wireless communication system 160 that may function as a peer-to-peer network. For example, the wireless communication system 160 shown in FIG. 1b shows STAs 106a-106i that may communicate with each other without the presence of an AP. As such, the STAs, 106a-106i may be configured to communicate in different ways to coordinate transmission and reception of messages to prevent interference and accomplish various tasks. In one aspect, the networks shown in FIG. 1b may configured as a "near-me are network" (NAN). In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

In some aspects, a communication protocol used for communication between nodes on the peer to peer communications network 160 may schedule periods of time during which communication between network nodes may occur. These periods of time when communication occurs between STAs 106a-106i may be known as availability windows. An availability window may include a discovery interval or paging interval as discussed further below.

The protocol may also define other periods of time when no communication between nodes of the network is to occur. In some embodiments, nodes may enter one or more sleep states when the peer to peer network 160 is not in an availability window. Alternatively, in some embodiments, portions of the stations 106a-i may enter a sleep state when the peer to peer network is not in an availability window. For example, some stations may include networking hardware that enters a sleep state when the peer to peer network is not in an availability window, while other hardware included in the STA, for example, a processor, an electronic display, or the like do not enter a sleep state when the peer to peer network is not in an availability window.

The peer to peer communication network 160 may assign one node to be a root node. In FIG. 1b, the assigned root node is shown as STA 106e. In peer to peer network 160, the root node is responsible for periodically transmitting synchronization signals to other nodes in the peer to peer network. The synchronization signals transmitted by root node 160e may provide a timing reference for other nodes 106a-d and 106f-i to coordinate an availability window during which communication occurs between the nodes. For example, a synchronization message 172a-172d may be transmitted by root node 106e and received by nodes 106b-106c and 106f-106g. The synchronization message 172 may provide a timing source for the STAs 106b-c and 106f-106g. The synchronization message 172 may also provide updates to a schedule for future availability windows. The synchronization messages 172 may also function to notify STAs 106b-106c and 106f-106g that they are still present in the peer to peer network 160.

Some of the nodes in the peer to peer communication network 160 may function as branch synchronization nodes. A branch synchronization node may retransmit both availability window schedule and master clock information received from a root node. In some embodiments, synchronization messages transmitted by a root node may include availability window schedule and master clock information. In these embodiments, the synchronization messages may be retransmitted by the branch synchronization nodes. In FIG. 1b, STAs 106b-106c and 106f-106g are shown functioning as branch-synchronization nodes in the peer to peer communication network 160. STAs 106b-106c and 106f-106g receive the synchronization message 172a-172d from root node 106e and retransmit the synchronization message as retransmitted synchronization messages 174a-174d. By retransmitting the synchronization message 172 from root node 106e, the branch synchronization nodes 106b-106c and 106f-106g may extend the range and improve the robustness of the peer to peer network 160.

The retransmitted synchronization messages 174a-174d are received by nodes 106a, 106d, 106h, and 106i. These nodes may be characterized as "leaf" nodes, in that they do not retransmit the synchronization message they receive from either the root node 106e or the branch synchronization nodes 106b-106c or 106f-106g.

Synchronization messages, or synchronization frames, may be transmitted periodically. However, periodic transmission of synchronization messages on a schedule may be problematic. These problems may be caused by clock drift of devices in the network. Each device in the network may have an internal clock, which may help the device determine availability windows during which the device may wake from a sleep state and transmit and/or receive messages on the network. These availability windows may be determined, at least in part, based on synchronization messages which are first transmitted by a root device. However, if the root device does not transmit synchronization messages frequently enough, some devices with large clock drifts may fail to remain connected to the network, as their availability windows may shift, relative to other devices on the network, such that the devices with large clock drifts may sleep during the availability windows of other devices on the network. The clock drifts on some devices, when combined with a large amount of time between synchronization messages, may lead to a large amount of synchronization error. Conversely, if the interval between synchronization messages is too small, the larger number of synchronization messages may introduce a large amount of unnecessary overhead to the network.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a root device in an ad-hoc wireless communication network comprising a receiver configured to receive a message from other devices in the network, the message including drift information of clocks of other devices in the network; a processor configured to set the timing of synchronization frames based, at least in part, on the drift information of clocks of other devices in the network; and a transmitter configured to transmit synchronization frames in accordance with the set timings.

In one aspect, a method of determining the timing of synchronization frames transmitted by a root device in an ad-hoc wireless communication network is disclosed, the method comprising receiving a message from a device in the wireless communication network, the message including drift information of clocks of devices in the network; determining a timing of synchronization frames, based at least in part on the drift information of clocks of devices in the network; and transmitting a synchronization frame based at least in part on the calculated timing of synchronization frames.

In one aspect, a non-transitory, computer readable medium comprising instructions that when executed cause a processor in a device to perform a method for wireless communication within a peer to peer network is disclosed, the method comprising receiving a message from a device in the wireless communication network, the message including drift information of clocks of devices in the network; determining a timing of synchronization frames, based at least in part on the drift information of clocks of devices in the network; and transmitting a synchronization frame based at least in part on the calculated timing of synchronization frames.

One aspect of the disclosure provides a wireless device in an ad-hoc wireless communication network comprising a receiver configured to receive one or more messages from one or more other devices in the network, the one or more messages including drift information of clocks of other devices in the network; a processor configured to determine adjusted drift information based at least in part on a clock drift of the wireless device and the drift information of clocks of other devices received in the one or more messages; and a transmitter configured to transmit messages to other devices in the network, the messages including adjusted drift information.

In one aspect, a method of transmitting clock drift information in an ad-hoc wireless communication network is disclosed, the method comprising receiving one or more messages over a network, the one or more messages including drift information of clocks of other devices in the network; determining clock drift information of a wireless device; comparing clock drift information of the wireless device to the drift information of clocks of other devices in the network; determining adjusted clock drift information based on the drift information of clocked of other devices in the network contained in the one or more messages, and based on the clock drift information of a wireless device; transmitting a message over a network the message including the adjusted clock drift information.

In one aspect, a non-transitory, computer readable medium comprising instructions that when executed cause a processor in a device to perform a method of transmitting clock drift information in an ad-hoc wireless communication network is disclosed, the method comprising receiving one or more messages over a network, the one or more messages including drift information of clocks of other devices in the network; determining clock drift information of a wireless device; comparing clock drift information of the wireless device to the drift information of clocks of other devices in the network; determining adjusted clock drift information based on the drift information of clocked of other devices in the network contained in the one or more messages, and based on the clock drift information of a wireless device; transmitting a message over a network the message including the adjusted clock drift information.

DETAILED DESCRIPTION

Figure 1A:
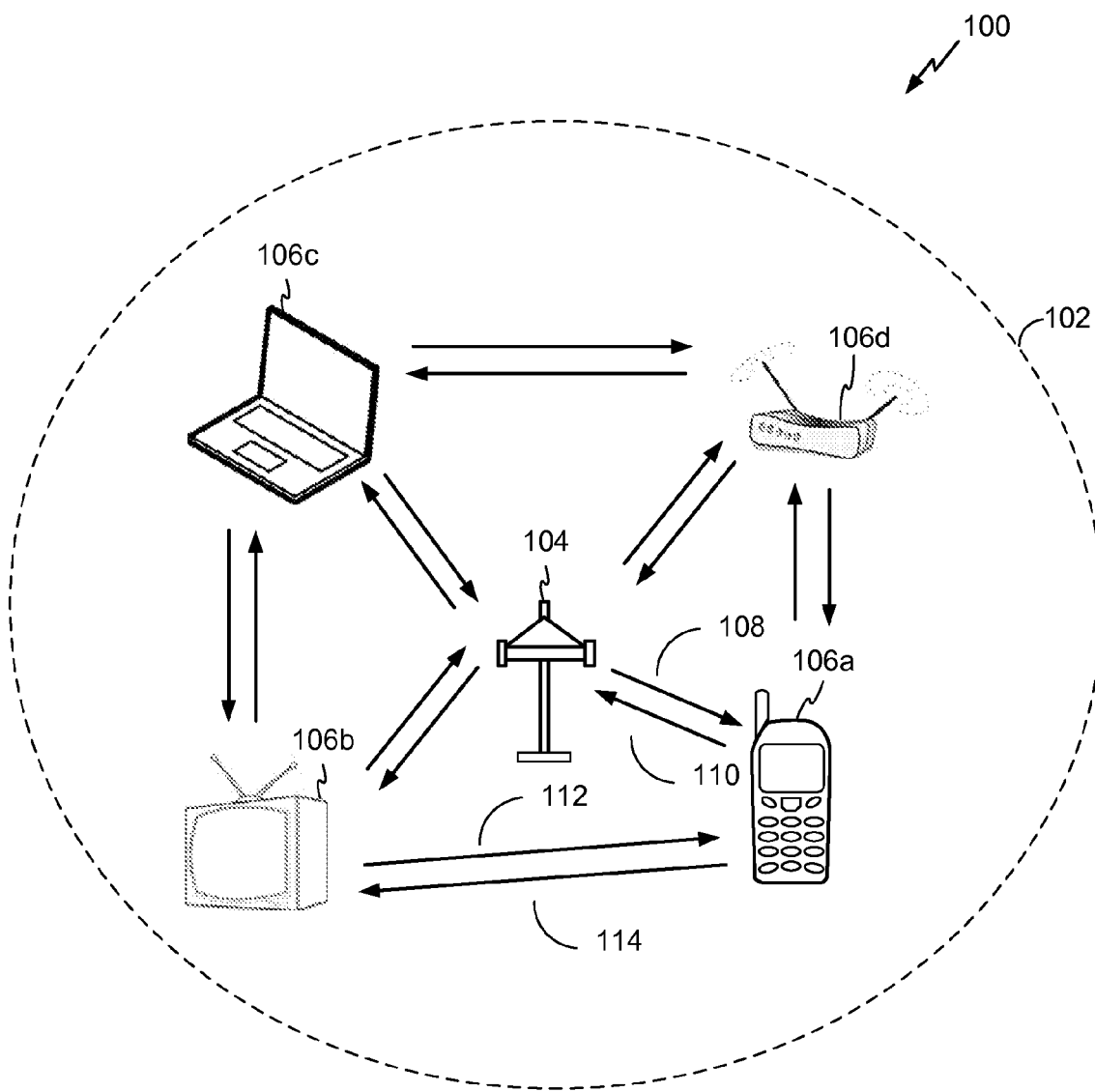
FIG. 1a illustrates an example of a prior art wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAB"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, a root node of a peer to peer network may transmit synchronization messages to coordinate one or more availability windows for communication between nodes of the peer to peer network. These synchronization messages may be transmitted on a fixed interval. For example, these synchronization messages may be transmitted once every 5, 10, 20, 50, or 100 availability windows. However, a fixed interval may be problematic as too short an interval may result in unnecessary network overheard, while too long an interval may result in synchronization error due to clock drift. Thus, it may be beneficial to optimize the intervals between synchronization messages in order to minimize synchronization errors while also minimizing unnecessary network overhead.

Figure 2:
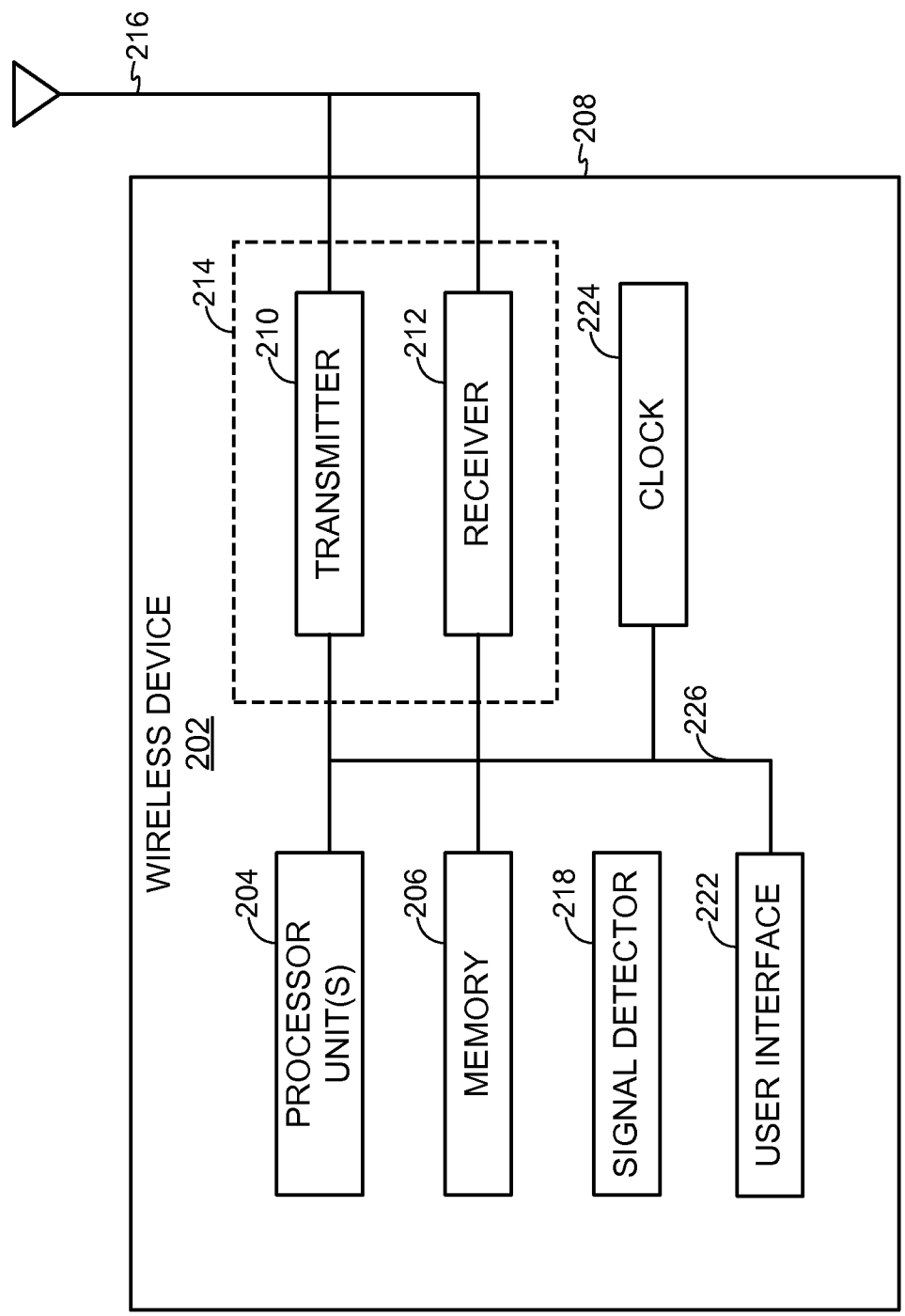
FIG. 2 illustrates a functional block diagram of a wireless device that may be employed within the wireless communication system of FIG. 1.

FIG. 2 illustrates various components that may be utilized in a wireless device 202 that may be employed within the wireless communication system 100 or 160. The wireless device 202 is an example of a device that may be configured to implement the various methods described herein. For example, the wireless device 202 may comprise the AP 104 or one of the STAs.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. In addition, the wireless device 202 may include a clock 224 configured to generate a clock signal that is used to coordinate and synchronize activities of the wireless device 202. In some configurations, the processor 204 may include the clock 224. The processor 204 may be configured to update the clock with a time value to allow for synchronization with other wireless devices.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 1B:
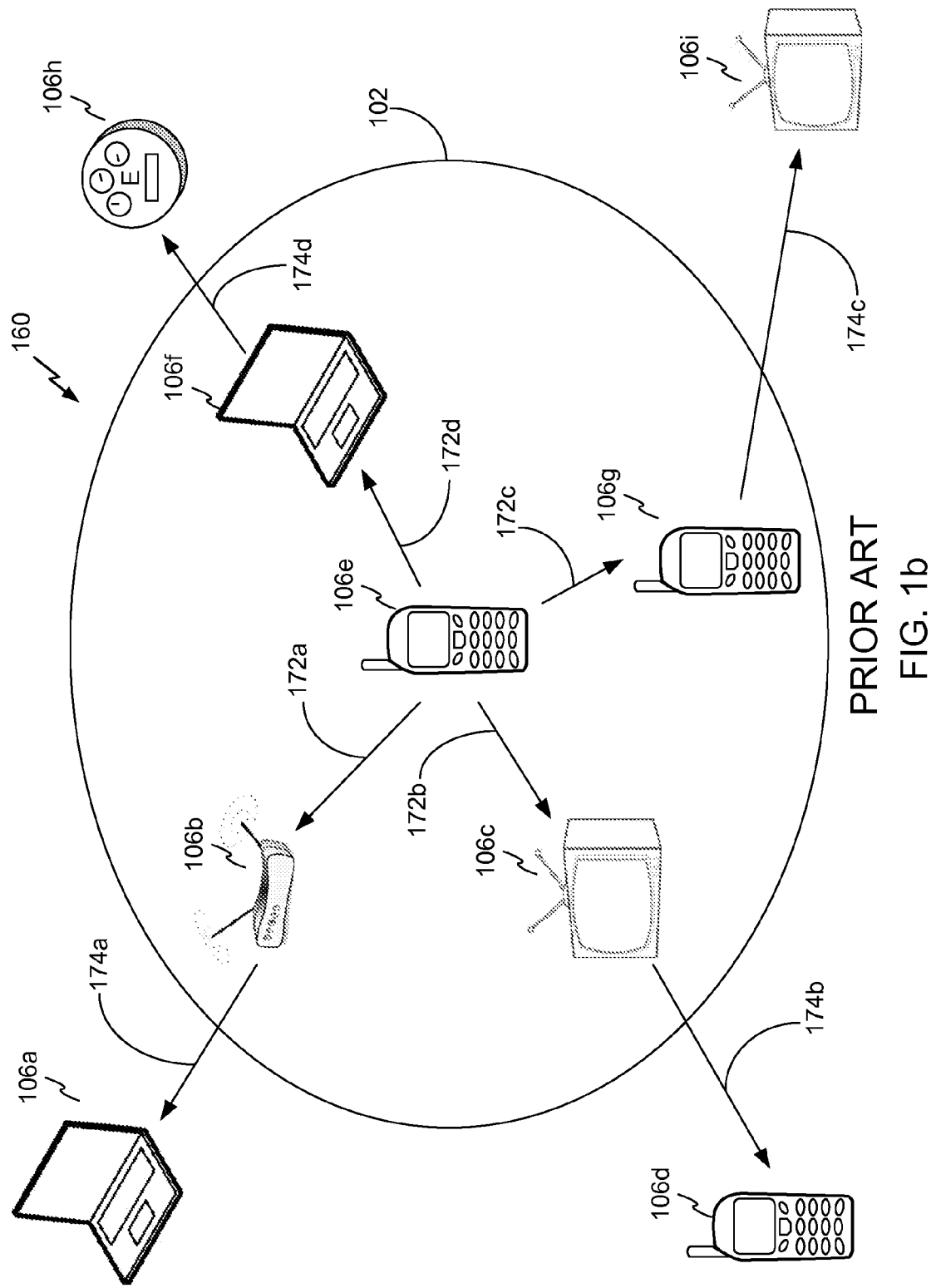
FIG. 1b illustrates another example of a prior art wireless communication system.

Devices, such as STAs, 106a-i shown in FIG. 1b, for example, may be used for neighborhood-aware networking, or social-WiFi networking. For example, various stations within the network may communicate on a device to device (e.g., peer-to-peer communications) basis with one another regarding applications that each of the stations supports. A discovery protocol may be used in a social-WiFi network to enable STAs to advertise themselves (e.g., by sending discovery packets) as well as discover services provided by other STAs (e.g., by sending paging or query packets), while ensuring secure communication and low power consumption.

In a neighborhood-aware or social-WiFi network, one device, such as wireless device 202, in the network may be designated as the root device or node. In some embodiments, the root device may be an ordinary device, like the other devices in the network, rather than a specialized device such as a router. In social-WiFi network, the root node may be responsible for periodically transmitting synchronization messages, or synchronization signals or frames, to other nodes in the network. The synchronization messages transmitted by root node may provide a timing reference for other nodes to coordinate an availability window during which communication occurs between the nodes. The synchronization message may also provide updates to a schedule for future availability windows. The synchronization messages may also function to notify STAs that they are still present in the peer to peer network.

Each device in the network may have a clock, such as clock 224 in wireless device 202. This clock may be an internal clock, built in to the device when it was constructed. This clock may be configured to generate a clock signal that is used to coordinate and synchronize activities of the device. However, this clock may have some amount of clock drift, where clock drift may represent the difference between the clock signals generated by the clock and clock signals that may be generated by an ideal clock. This clock drift may be present in the clock of the root node as well as in clocks on branch nodes and leaf nodes in a social-WiFi network.

Clock drift may be random, or may be constant to some extent. Clock drift may be expressed in a number of ways. For example, clock drift may be expressed as:

$$t_n = (1+d_n)t$$

where t is the actual time, $t_n$ is the time as measured on the nth wireless device, and $d_n$ is the clock drift of the nth wireless device.

This formula may provide an approximation of clock drift. This approximation may be more or less accurate, depending upon the nature of the clock drift. For example, if clock drift is constant or nearly constant, this formula may provide a very accurate approximation of clock drift, as long as $d_n$ can be accurately calculated. The clock drift $d_n$ may be either positive or negative, corresponding to a clock that is either too fast or too slow.

Clock drift may introduce a certain amount of synchronization error to the network. In a social-WiFi network, devices on the network may use synchronization messages transmitted by a root device and retransmitted by branch devices in order to determine availability windows. During these availability windows, devices in the social-WiFi network may be configured to transmit and/or receive messages from other devices on the network. At other times, devices, or portions of devices, on the social-WiFi network may be in a sleep state. For example, a device on a social-WiFi network, such as wireless device 202, may enter a sleep state based at least in part on synchronization messages received from a root node. In some embodiments, devices on a social-WiFi network may enter a sleep mode, where one or more elements of the device may enter a sleep mode, rather than the entire device. For example, wireless device 202 may enter a sleep mode where the transmitter 210, receiver 212, and/or transceiver 214 may enter a sleep mode based on synchronization messages received on a social-WiFi network. This sleep mode may enable a wireless device 202 to conserve power or battery life.

Figure 3:
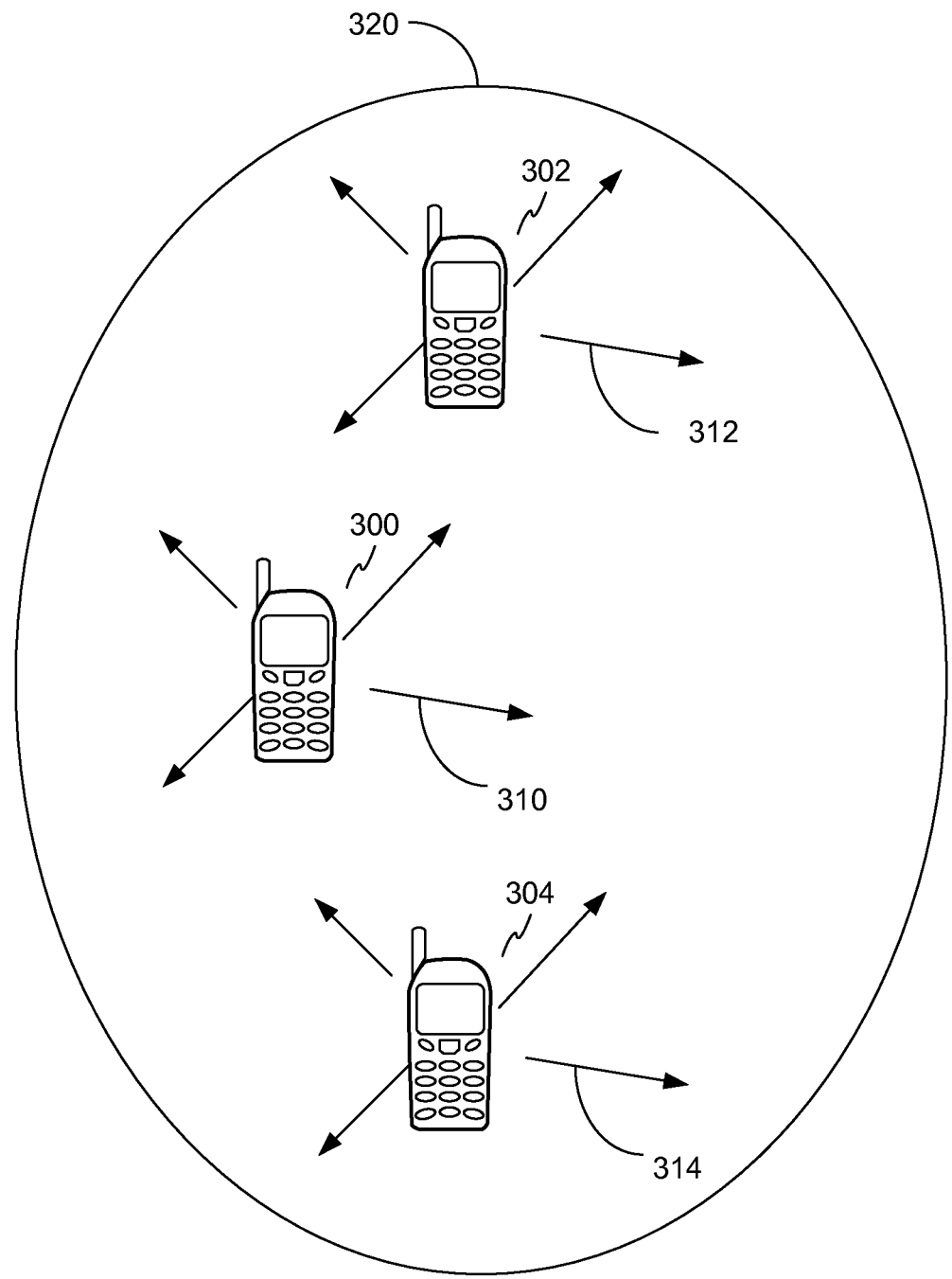
FIG. 3 illustrates an example of a communication system in which aspects of the present disclosure may be employed.

FIG. 3 illustrates an example of a communication system in which aspects of the present disclosure may be employed. Wireless device 300 may be a wireless device, such as wireless device 200. Wireless device 300 may be the root node of a peer-to-peer network, such as social-WiFi network 320. Wireless device 300 may be configured to transmit messages 310 to other devices on the social-WiFi network 320. As the root device, wireless device 300 may be configured to transmit synchronization messages on some interval to other devices on the social-WiFi network 320.

Wireless devices 302 and 304 may be nodes on the social-WiFi network 320. Wireless devices 302 and 304 may be branch nodes or leaf nodes on the network 320. As nodes on the social-WiFi network 320, wireless devices 302 and 304 may transmit messages 312 and 314 to other devices on the network 320. These messages may be transmitted to other devices during an availability window, during which time each device is configured to transmit and/or receive transmissions from other wireless devices on the network 320. For example, wireless device 302 may transmit messages 312 to wireless device 304 during an availability window for both devices, where the availability windows is based in part upon a synchronization message received from wireless device 300.

Because devices on the social-WiFi network 320 may have limited availability windows, clock drift may introduce synchronization error into the network 320. For example, each wireless device 300, 302 and 304 may have a clock drift. Wireless device 300 may, as the root node, periodically transmit synchronization messages. In some embodiments, synchronization messages may indicate the frequency of availability windows for devices in the network 320, and may further indicate the frequency of synchronization messages and/or the interval until the next synchronization message.

A social-WiFi network 320 may have a synchronization error. This synchronization error may be expressed as a number of seconds, such as 0.001, 0.01, 0.1, 1 or another amount of seconds. This synchronization error may indicate the amount of clock drift between synchronization messages. For example, synchronization error may be calculated according to the formula:

$$SE_n = |X(1+d_n) - X(1+d_r)| = X|d_n - d_r|$$

where $SE_n$ is the synchronization error for the nth non-root wireless device, $d_n$ is the clock drift of the nth wireless device, $d_r$ is the clock drift of the root wireless device, where X is the number of seconds since the last synchronization message, and where |.| denotes taking an absolute value.

It may be desirable to limit the synchronization error that may occur in a network. A device with a synchronization error that is too high may be unable to remain connected to a social-WiFi network. In order to limit synchronization error, it may be desirable to optimize the frequency with which synchronization frames may be transmitted by the root node. For example, the frequency with which the root node may send synchronization frames may be based, at least in part, on the clock drifts of one or more devices connected to the social-WiFi network.

Figure 4:
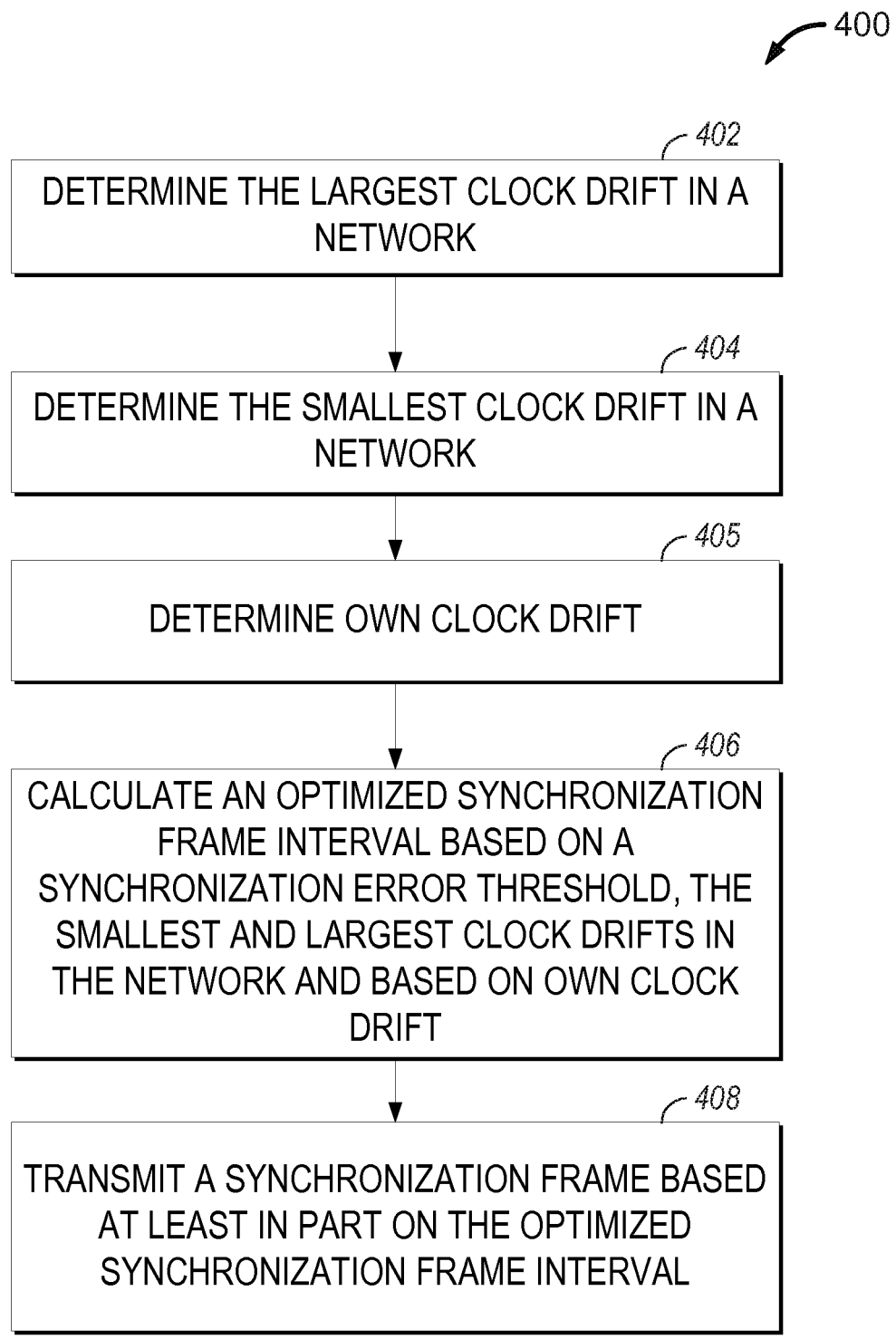
FIG. 4 is a flowchart of a method for transmitting synchronization frames on a social-WiFi network.

FIG. 4 is a flowchart of a method for transmitting synchronization frames on a social-WiFi network. This method may be executed by a root node of the social-WiFi network, which may be a device such as wireless device 202.

At block 402, the root node determines the largest clock drift in a network. This clock drift may be expressed as $d_r$ as discussed above. In the above formula, a large clock drift may represent a device which has an internal clock that is too fast.

At block 404, the root node determines the smallest clock drift in a network. This clock drift may be expressed as $d_r$ as discussed above. Because clock drifts may be either a positive or a negative number, the smallest clock drift in a network may be a negative number. A negative clock drift may represent a device which has an internal clock that is too slow.

At block 405, the root node determines its own clock drift. This clock drift may be programmed into a root node, or the root node may be able to determine its own clock drift. For example, the root node may be able to determine its own clock drift based upon a comparison between its own internal clock and an accurate external timing source, such as a GPS satellite or other source.

At block 406, the root node calculates an optimized synchronization frame interval based on a synchronization error threshold, the largest and smallest clock drifts in the network and the root node's own clock drift. This may be calculated in a number of ways. For example, a social-WiFi network may have a maximum synchronization error threshold, $\epsilon$. This maximum synchronization error threshold may represent the maximum allowable synchronization error for any device in a network. This maximum synchronization error threshold may be based, at least in part, on the length of an availability window on the network. For example, if an availability window of a device on the network is longer, the maximum synchronization error threshold may also be longer. The length of availability windows of devices on the network may be standardized for a networking protocol, such as social-WiFi, or may be determined based, at least in part, on information contained in a synchronization message or another message transmitted on the network. Determining the length of an availability window may represent a trade-off between battery life and network overhead, as longer availability windows may require more power while shorter availability windows may require more network overhead in the form of more frequent synchronization messages. The maximum synchronization error threshold may be set in a number of ways. For example, the maximum synchronization error threshold may be set on a device at the factory when the device is constructed, or may be acquired from a server. The root device may acquire the maximum synchronization error threshold by checking a server, if connecting to the server is possible.

In order to ensure that the synchronization error for a particular device n is below the maximum synchronization error threshold, synchronization messages should be transmitted no later than the following upper limit:

$$X < \frac{\varepsilon}{|d_n - d_r|}$$

where X is the number of seconds between synchronization messages, $d_n$ is the clock drift of the nth wireless device, $d_r$ is the clock drift of the root wireless device, and where $\epsilon$ is maximum synchronization error threshold.

Thus, in order to ensure that synchronization error is below the maximum synchronization error threshold for any device on the network, the root device should send a synchronization frame no less frequently than $$X < \frac{\varepsilon}{\max_n |d_n - d_r|}$$

where X is the number of seconds between synchronization messages, $d_n$ is the clock drift of the nth wireless device, $d_r$ is the clock drift of the root wireless device, and where $\epsilon$ is maximum synchronization error threshold. This formula may be used for each and every device on the network, and the value of X may be set so that the formula is true for each device on the network. However, because in the flowchart 400, the root node has access to the highest and the lowest clock drifts in the network, the root node will only need to use this formula twice at block 406 in order to calculate an optimized synchronization frame interval.

While the above formula is true, and may be used to determine the maximum time in seconds between synchronization frames, it may be more useful to instead express the maximum synchronization error threshold in root time, rather than in real time. This may be calculated by accounting for the clock drift of the root device, using the formula $$X_r < \frac{\varepsilon(1 + d_r)}{\max_n |d_n - d_r|}$$

where $X_r$ is the number of seconds between synchronization messages as calculated using the clock of the root device, $d_n$ is the clock drift of the nth wireless device, $d_r$ is the clock drift of the root wireless device, and where $\epsilon$ is maximum synchronization error threshold. Thus, the root device may be configured to send synchronization messages at least as often as $X_r$ seconds, as shown on the clock of the root device. Thus, this formula is an example of a formula that may be used to calculate an optimized synchronization frame interval, based at least in part on the largest and smallest clock drifts, as in block 406. For example, the denominator of the above formula may be calculated using the formula $$\max_n |d_n - d_r| = \max\{|d_{max} - d_r|, |d_r - d_{min}|\}$$

where $d_n$ is the clock drift of the nth wireless device, $d_r$ is the clock drift of the root wireless device, $d_{max}$ is the largest clock drift on the network, and $d_{min}$ is the smallest clock drift on the network.

In some embodiments, a root node may have an absolute maximum or minimum clock drift. For example, the root device may use the absolute maximum clock drift to calculate an optimized synchronization frame frequency rather than the largest clock drift on the network, if the largest clock drift on the network is too large. While this may result in some devices becoming unable to remain connected to the network, this may be necessary in order to reduce network overhead.

In some embodiments, a root device may have a minimum synchronization frame interval, and may use this interval rather than the calculated optimal synchronization frame interval if the minimum synchronization frame interval is larger than the optimal synchronization frame interval. This may be beneficial in order to reduce network overhead. In some embodiment, a root device may have a maximum synchronization frame interval, and may use this interval rather than the calculated optimal synchronization frame interval if the maximum synchronization frame interval is smaller than the optimal synchronization frame interval. This may be beneficial in order to allow new devices to remain connected to the network, or in case some devices may not correctly be reporting their own clock drifts.

Finally, at block 408, the method may transmit a synchronization frame based at least in part on the optimized synchronization frame interval. For example, the time at which this synchronization frame is transmitted may be based, at least in part, on the calculation of an optimized synchronization frame interval. In some embodiments, the synchronization frame may indicate when a next synchronization frame may be transmitted. The timing of the next synchronization frame may be based, at least in part, upon the calculation of the optimized synchronization frame interval.

Figure 5:
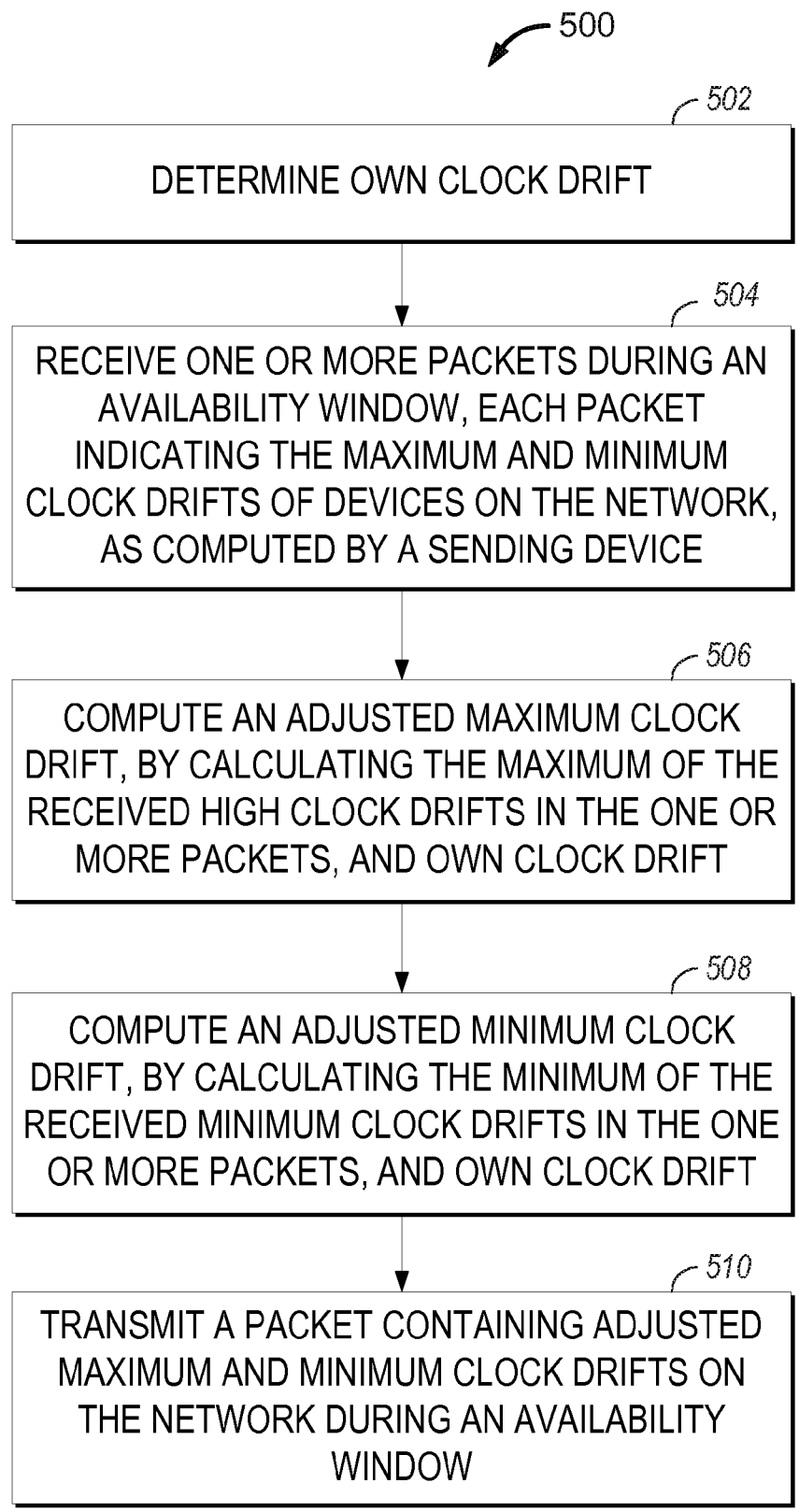
FIG. 5 is a flowchart of a method for transmitting clock drift information on a social-WiFi network.

In order to optimize the number of seconds between synchronization messages, according to the above disclosure, a root device must have access to the clock drifts of wireless devices on the network. This may be accomplished in a number of ways. FIG. 5 is a flowchart of a method for transmitting clock drift information on a social-WiFi network. This method may be executed by a wireless device on a social-WiFi network, such as wireless device 202.

In block 502, the wireless device determines its own clock drift. For example, each wireless device on a social-WiFi network may have information about its own clock drift $d_n$. In some embodiments, this information may be programmed onto a wireless device at the time the wireless device is made or programmed. For example, the clock of a wireless device may be tested at a factory or other facility, or may contain a known error, which may be programmed into the device at the time the device is constructed. In some embodiments, a wireless device may be able to calculate its own clock drift. For example, a wireless device may have access to an accurate external timing reference, such as a clock on a global positioning system (GPS) satellite or a cellular tower. A wireless device may also have access to an accurate external timing reference through a network such as the internet. The wireless device may use this access to an accurate external timing reference in order to measure its own clock drift by comparing a duration of time on the accurate external timing reference with a duration of time on its own internal clock. The wireless device may be configured to recalibrate its clock drift on some set interval, and/or may be configured to recalibrate its clock drift when, for example, the wireless device finds that it has become de-synchronized from a social-WiFi network.

In block 504, the wireless device receives one or more packets during an availability window containing maximum and minimum clock drifts of devices on a network, as computed by a sending device. This packet may be any type of packet. For example, this packet may be a discovery packet.

In block 506, the wireless device computes an adjusted maximum clock drift, by calculating the maximum of its own clock drift and each received maximum clock drift in the one or more packets.

In block 508, the wireless device computes an adjusted minimum clock drift, by calculating the minimum of its own clock drift and each received minimum clock drift in the one or more packets.

In block 510, the wireless device transmits a packet containing adjusted maximum and minimum clock drifts on the network during an availability window. For example, the wireless device may transmit adjusted maximum and minimum clock drifts in its next packet, during a later availability window.

In some embodiments, it may be beneficial for a wireless network to periodically reset the maximum and minimum clock drifts on the network. For example, as devices may leave the network, the maximum and minimum clock drift of any device on the network may change. However, this change may not be observed using the method of FIG. 5 on its own. Therefore, it may be beneficial for a root device to periodically send "reset" messages in a packet, such as a synchronization frame. Upon receiving a "reset" message, each wireless device on a network may reset both its adjusted maximum clock drift and adjusted minimum clock drift to correspond to that device's own clock drift. In future availability windows, the method of FIG. 5 may continue to be used, but these "reset" messages may allow the maximum and minimum clock drifts on the network to reset, and to accommodate for when some devices leave the network, which may change the maximum and minimum clock drifts on the network.

It should be understood that any reference to an element herein using a designation such as "first," "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A root device in an ad-hoc wireless communication network comprising:
   a receiver configured to receive a message from other devices in the network, the message including drift information of clocks of other devices in the network, wherein the drift information comprises a maximum network clock drift and a minimum network clock drift;
   a processor configured to:
      determine an adjusted maximum network clock drift based on a maximum clock drift of the wireless device and the maximum network clock drift;
      determine an adjusted minimum network clock drift based on a minimum clock drift of the wireless device and the minimum network clock drift; and
      set a timing of synchronization frames based, at least in part, on the drift information, a clock drift of the root device, the adjusted maximum network clock drift, and the adjusted minimum network clock drift; and
   a transmitter configured to transmit synchronization frames in accordance with the set timings.

2. The root device of claim 1, wherein the processor is further configured to determine the clock drift of the root device.

3. The root device of claim 1, wherein the transmitter is configured to transmit synchronization frames which include information of a timing of a next synchronization frame, the timing of the next synchronization frame based at least in part on the set timing of synchronization frames.

4. A method of determining a timing of synchronization frames transmitted by a root device in an ad-hoc wireless communication network, the method comprising:
   receiving a message from a device in the wireless communication network, the message including drift information of clocks of devices in the network, wherein the drift information comprises a maximum network clock drift and a minimum network clock drift;
   determining an adjusted maximum network clock drift based on a maximum clock drift of the wireless device and the maximum network clock drift;
   determining an adjusted minimum network clock drift based on a minimum clock drift of the wireless device and the minimum network clock drift; and
   determining the timing of synchronization frames, based at least in part on the drift information, a clock drift of the root device, the adjusted maximum network clock drift, and the adjusted minimum network clock drift; and
   transmitting a synchronization frame based at least in part on the determined timing of synchronization frames.

5. The method of claim 4, wherein determining the timing of synchronization frames comprises calculating the timing of synchronization frames, based at least in part on an absolute maximum clock drift threshold and an absolute minimum clock drift threshold and the maximum clock drift in the network and the minimum clock drift in the network.

6. The method of claim 4, wherein the method further comprises determining the clock drift of the root device.

7. The method of claim 4, wherein transmitting a synchronization frame comprises transmitting a synchronization frame that includes information about a timing of a next synchronization frame, the information about the timing of the next synchronization frame based at least in part on the determined timing of synchronization frames.

8. A non-transitory, computer readable medium comprising instructions that when executed cause a processor in a device to perform a method for wireless communication within a peer to peer network, the method comprising:
    receiving a message from a device in the wireless communication network, the message including drift information of clocks of devices in the network, wherein the drift information comprises a maximum network clock drift and a minimum network clock drift;
    determining an adjusted maximum network clock drift based on a maximum clock drift of the wireless device and the maximum network clock drift;
    determining an adjusted minimum network clock drift based on a minimum clock drift of the wireless device and the minimum network clock drift;
    determining a timing of synchronization frames, based at least in part on the drift information, a clock drift of the root device, the adjusted maximum network clock drift, and the adjusted minimum network clock drift; and
    transmitting a synchronization frame based at least in part on the determined timing of synchronization frames.

9. The non-transitory, computer readable medium of claim 8, wherein determining a timing of synchronization frames comprises calculating a timing of synchronization frames, based at least in part on an absolute maximum clock drift threshold and an absolute minimum clock drift threshold and the maximum clock drift in the network and the minimum clock drift in the network.

10. The non-transitory, computer readable medium of claim 8, wherein the method further comprises determining the clock drift of a root device.

11. The non-transitory, computer readable medium of claim 8, wherein transmitting a synchronization frame comprises transmitting a synchronization frame that includes information about a timing of a next synchronization frame, the information of the timing of the next synchronization frame based at least in part on the determined timing of synchronization frames.

12. A wireless device in an ad-hoc wireless communication network comprising:
    a receiver configured to receive one or more messages from one or more other devices in the network, the one or more messages including drift information of clocks of other devices in the network, wherein the drift information comprises a maximum network clock drift and a minimum network clock drift;
    a processor configured to:
        determine an adjusted maximum network clock drift based on a maximum clock drift of the wireless device and the maximum network clock drift;
        determine an adjusted minimum network clock drift based on a minimum clock drift of the wireless device and the maximum network clock drift; and
        determine adjusted drift information based at least in part on a clock drift of the wireless device, the drift information, the adjusted maximum network clock drift, and the adjusted minimum network clock drift; and
    a transmitter configured to transmit a message to other devices in the network, the message including the adjusted drift information.

13. The wireless device of claim 12, wherein the processor is configured to determine the adjusted maximum network clock drift by calculating the maximum clock drift of the wireless device and the maximum network clock drift based on each of the one or more received messages and to determine the adjusted minimum network clock drift by calculating the minimum clock drift of the wireless device and the minimum network clock drift based on each of the one or more received messages.

14. The wireless device of claim 13, wherein the processor is configured to compare the clock drift of the wireless device to an absolute maximum clock drift threshold and to an absolute minimum clock drift threshold to determine the adjusted drift information.

15. The wireless device of claim 14, wherein the processor is configured to not include the clock drift of the wireless device in the adjusted drift information if the clock drift of the wireless device is above the absolute maximum clock drift threshold or if the clock drift of the wireless device is below an absolute minimum clock drift threshold.

16. The wireless device of claim 12, wherein the processor is further configured to determine the clock drift of the wireless device.

17. The wireless device of claim 16, wherein the processor is programmed with the clock drift of the clock in the wireless device.

18. The wireless device of claim 16, wherein the processor is configured to determine the clock drift of the wireless device based at least in part on an accurate external timing source.

19. The wireless device of claim 12, wherein the processor is further configured to receive a reset message and to determine the adjusted drift information based only on the clock drift of the wireless device when the reset message is received.

20. A method of transmitting clock drift information in an ad-hoc wireless communication network, the method comprising:
    receiving one or more messages over the network, the one or more messages including drift information of clocks of other devices in the network, wherein the drift information comprises a maximum network clock drift and a minimum network clock drift;
    determining clock drift information of a wireless device;
    comparing the clock drift information of the wireless device to the drift information;
    determining an adjusted maximum network clock drift based on a maximum clock drift of the wireless device and the maximum network clock drift;
    determining an adjusted minimum network clock drift based on a minimum clock drift of the wireless device and the maximum network clock drift;
    determining adjusted clock drift information based on the drift information, the clock drift information of the wireless device, the adjusted maximum network clock drift, and the adjusted minimum network clock drift; and
    transmitting a message over the network, the message including the adjusted clock drift information.

21. The method of claim 20, wherein determining the adjusted clock drift information comprises:
    determining the adjusted maximum network clock drift, by calculating the maximum clock drift of the wireless device and the maximum network clock drift based on each of the one or more received messages; and
    determining the adjusted minimum network clock drift, by calculating the minimum clock drift of the wireless device and the minimum network clock drift based on each of the one or more received messages.

22. The method of claim 20, further comprising comparing the clock drift of the wireless device to an absolute maximum clock drift threshold and to an absolute minimum clock drift threshold.

23. The method of claim 20, wherein determining the clock drift information of the wireless device comprises accessing a measurement of the clock drift of the wireless device that is programmed into the wireless device.

24. The method of claim 23, wherein determining the clock drift information of the wireless device comprises calculating the clock drift of the wireless device, based at least in part on an accurate external timing source.

25. The method of claim 20, further comprising:
receiving a reset message over the network; and
determining adjusted clock drift information in the network based only on the clock drift information of the wireless device.

26. A non-transitory, computer readable medium comprising instructions that when executed cause a processor in a device to perform a method of transmitting clock drift information in an ad-hoc wireless communication network, the method comprising:
receiving one or more messages over a network, the one or more messages including drift information of clocks of other devices in the network, wherein the drift information comprises a maximum network clock drift and a minimum network clock drift;
determining clock drift information of a wireless device;
comparing the clock drift information of the wireless device to the drift information;
determining an adjusted maximum network clock drift based on a maximum clock drift of the wireless device and the maximum network clock drift;
determining an adjusted minimum network clock drift based on a minimum clock drift of the wireless device and the maximum network clock drift;
determining adjusted clock drift information based on the drift information the clock drift information of the wireless device, the adjusted maximum network clock drift, and the adjusted minimum network clock drift; and
transmitting a message over the network the message including the adjusted clock drift information.

27. The non-transitory, computer readable medium of claim 26, wherein determining the adjusted clock drift information comprises:
determining the adjusted maximum network clock drift, by calculating the maximum clock drift of the wireless device and the maximum network clock drift based on each of the one or more received messages; and
determining the adjusted minimum network clock drift, by calculating the minimum clock drift information of the wireless device and the minimum network clock drift based on each of the one or more received messages.

28. The non-transitory, computer readable medium of claim 26, further comprising comparing the clock drift of the wireless device to an absolute maximum clock drift threshold and to an absolute minimum clock drift threshold.

29. The non-transitory, computer readable medium of claim 26, wherein determining the clock drift information of the wireless device comprises accessing a measurement of the clock drift of the wireless device that is programmed into the wireless device.

30. The non-transitory, computer readable medium of claim 29, wherein determining the clock drift information of the wireless device comprises calculating the clock drift of the wireless device, based at least in part on an accurate external timing source.

31. The non-transitory, computer readable medium of claim 26, the method further comprising:
receiving a reset message over the network; and
determining adjusted clock drift information in the network based only on the clock drift information of the wireless device.

\* \* \* \* \*